(12) United States Patent
White et al.

(10) Patent No.: US 7,821,970 B2
(45) Date of Patent: Oct. 26, 2010

(54) PROTECTION OF TRANSIT LINKS IN A NETWORK

(75) Inventors: Russell White, Holly Springs, NC (US); James L. Ng, Mebane, NC (US); Donnie V. Savage, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 11/862,161

(22) Filed: Sep. 26, 2007

(65) Prior Publication Data

US 2009/0080436 A1 Mar. 26, 2009

(51) Int. Cl.
*H04L 1/00* (2006.01)
*H04L 12/26* (2006.01)

(52) U.S. Cl. .................. 370/255; 370/230.1; 370/231; 370/235

(58) Field of Classification Search ......... 370/229–231, 370/235, 236, 254, 255
See application file for complete search history.

(56) References Cited

U.S. PATENT DOCUMENTS

| | | |
|---|---|---|
| 5,088,032 A | 2/1992 | Bosack |
| 6,567,380 B1 | 5/2003 | Chen |
| 6,728,779 B1 | 4/2004 | Griffin et al. |
| 6,728,782 B1 | 4/2004 | D'Souza et al. |
| 6,760,777 B1 | 7/2004 | Agarwal et al. |
| 6,952,740 B1 | 10/2005 | Cain et al. |
| 6,956,858 B2 | 10/2005 | Hariguchi et al. |
| 7,035,256 B1 | 4/2006 | Neufeld et al. |
| 7,054,311 B2 | 5/2006 | Norman et al. |
| 7,080,161 B2 | 7/2006 | Leddy et al. |
| 7,085,241 B1 | 8/2006 | O'Neill et al. |
| 7,107,329 B1 | 9/2006 | Schroder et al. |
| 2004/0258002 A1 | 12/2004 | Tran et al. |
| 2009/0034470 A1* | 2/2009 | Nagarajan et al. ........... 370/331 |

* cited by examiner

*Primary Examiner*—Ronald Abelson
(74) *Attorney, Agent, or Firm*—Patent Capital Group

(57) ABSTRACT

A router identifies transit links and non-transit links. Only the non-transit links are advertised as routes to adjacent routers, thereby protecting the transit links from edge traffic which terminates on a network on one of the transit links. In another aspect of the invention, an administrative whitelist supplements the routes which identify the transit link network routes. In another aspect of the invention, a method for advertising routes identifies entries in a router table as broadcast or point-to-point. Only the router table entries for point-to-point links which are not transit or broadcast links that are not for a neighboring router are advertised, whereas the point-to-point transit links or broadcast transit links are advertised as transit links if an administrative whitelist is enabled.

20 Claims, 6 Drawing Sheets

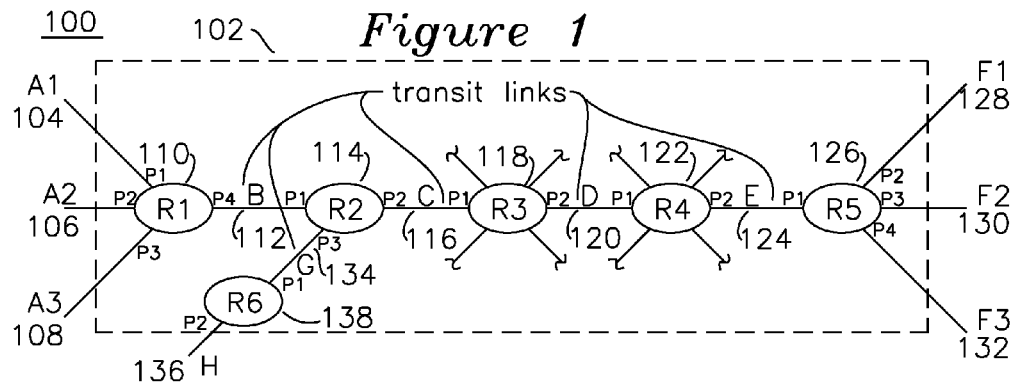

*Figure 1*

*Figure 2A*
R1 Route Table
(no C,D,E,G)

| Netwk | Intfc | Type | How Found |
|---|---|---|---|
| A1 | P1 | Edge | Attached Router |
| A2 | P2 | Edge | Attached Router |
| A3 | P3 | Edge | Attached Router |
| B | P4 | Transit | Attached Router |
| F1 | P4 | Edge | R5->R4->R3->R2->R1 |
| F2 | P4 | Edge | R5->R4->R3->R2->R1 |
| F3 | P4 | Edge | R5->R4->R3->R2->R1 |
| H | P4 | Edge | R6->R2->R1 |

*Figure 2B*
R2 Route Table (no D,E)

| Netwk | Intfc | Type | How Found |
|---|---|---|---|
| A1 | P1 | Edge | R1->R2 |
| A2 | P1 | Edge | R1->R2 |
| A3 | P1 | Edge | R1->R2 |
| F1 | P2 | Edge | R5->R4->R3->R2 |
| F2 | P2 | Edge | R5->R4->R3->R2 |
| F3 | P2 | Edge | R5->R4->R3->R2 |
| B | P3 | Transit | Attached Router |
| C | P3 | Transit | Attached Router |
| G | P3 | Transit | Attached Router |
| H | P3 | Edge | R6->R2 |

Figure 2C
R3 Route Table (no B,G,E)

| Netwk | Intfc | Type | How Found |
|---|---|---|---|
| A1 | P1 | Edge | R1->R2->R3 |
| A2 | P1 | Edge | R1->R2->R3 |
| A3 | P1 | Edge | R1->R2->R3 |
| F1 | P2 | Edge | R5->R4->R3 |
| F2 | P2 | Edge | R5->R4->R3 |
| F3 | P2 | Edge | R5->R4->R3 |
| H | P1 | Edge | R6->R2->R3 |
| C | P1 | Transit | Attached Router |
| D | P2 | Transit | Attached Router |

Figure 2D
R4 Route Table (no B,C,G)

| Netwk | Intfc | Type | How Found |
|---|---|---|---|
| A1 | P1 | Edge | R1->R2->R3->R4 |
| A2 | P1 | Edge | R1->R2->R3->R4 |
| A3 | P1 | Edge | R1->R2->R3->R4 |
| F1 | P2 | Edge | R5->R4 |
| F2 | P2 | Edge | R5->R4 |
| F3 | P2 | Edge | R5->R4 |
| H | P1 | Edge | R6->R2->R3->R4 |
| D | P1 | Transit | Attached Router |
| E | P2 | Transit | Attached Router |

R5 Route Table (no B,C,D,G)

| Netwk | Intfc | Type | How Found |
|---|---|---|---|
| A1 | P1 | Edge | R1->R2->R3->R4->R5 |
| A2 | P1 | Edge | R1->R2->R3->R4->R5 |
| A3 | P1 | Edge | R1->R2->R3->R4->R5 |
| E | P1 | Transit | Attached Router |
| F1 | P2 | Edge | Attached Router |
| F2 | P3 | Edge | Attached Router |
| F3 | P4 | Edge | Attached Router |
| H | P1 | Edge | R6->R2->R3->R4->R5 | marking and advertising transit links adding advertised links to route table

Supplemental R1 Route Table
(Administrative white list)

| Netwk | Intfc | Type | How Found |
|---|---|---|---|
| C | P4 | Admin | R2->R1 |
| D | P4 | Admin | R3->R2->R1 |
| E | P4 | Admin | R4->R3->R2->R1 |
| G | P4 | Admin | R2->R1 |

502

Supplemental R2 Route Table
(Administrative white list)

| Netwk | Intfc | Type | How Found |
|---|---|---|---|
| D | P4 | Admin | R3->R2 |
| E | P4 | Admin | R4->R3->R2 |

504

Figure 5C
Supplemental R3 Route Table
(Administrative white list)

| Netwk | Intfc | Type | How Found |
|---|---|---|---|
| B | P1 | Admin | R2->R3 |
| E | P2 | Admin | R4->R3 |
| G | P1 | Admin | R2->R3 |

Figure 5D
Supplemental R4 Route Table
(Administrative white list)

| Netwk | Intfc | Type | How Found |
|---|---|---|---|
| B | P1 | Admin | R2->R3->R4 |
| C | P1 | Admin | R3->R4 |
| G | P1 | Admin | R2->R3->R4 |

Figure 5E
Supplemental R5 Route Table
(Administrative white list)

| Netwk | Intfc | Type | How Found |
|---|---|---|---|
| B | P1 | Admin | R2->R3->R4->R5 |
| G | P1 | Admin | R2->R3->R4->R5 |
| C | P1 | Admin | R3->R4->R5 |
| D | P1 | Admin | R4->R5 |

US 7,821,970 B2

PROTECTION OF TRANSIT LINKS IN A NETWORK

BACKGROUND OF THE INVENTION

1. Technical Field

The present disclosure relates generally to the protection of transit links within a routing infrastructure by preventing devices outside the routed infrastructure from generating edge traffic which terminates in a device on a transit link inside the routed infrastructure.

2. Description of the Related Art

A data network comprises routers and networks which interconnect the routers, where the network also provides connectivity to end stations, and in one type of network known as a routed infrastructure, the networks associated with end stations are known as edge networks, and the networks which provide connectivity between routers and which carry traffic principally from one router to another within the routed infrastructure are known as transit links. The routers of a routed infrastructure are also known as interior routers, which route packets through the network according to interior gateway protocols (IGP) whereby each router develops a route table indicating on which router interface a particular network address or range of network addresses may be found, such that when an IP packet having a particular destination address is received, the packet is emitted on the interface associated with that network address. The route table for each router contains only local data related to the interface on which each network may be found, such as by a set of route table entries, each entry having a network address or address range and the associated interface to send a packet bearing the particular network address.

A station on an edge network may receive an advertised route directly, thereby providing information about address ranges of routing networks. More generally, stations on the edge network may be able to undesirably access networks on the routed infrastructure, particularly stations on the transit links.

BRIEF DESCRIPTION OF THE DRAWINGS

FIG. 1 illustrates a routed infrastructure with attached edge networks.

FIGS. 2A, 2B, 2C, 2D, and 2E illustrates route tables for the routers of FIG. 1.

FIG. 3 illustrates a flowchart for marking and advertising transit links.

FIG. 4 illustrates a flowchart for adding advertised links to a route table.

FIGS. 5A, 5B, 5C, 5D, and 5E illustrates supplemental route tables for the routers of FIG. 1.

DESCRIPTION OF THE EXAMPLE EMBODIMENTS

General Overview

Figures 2E, 3:
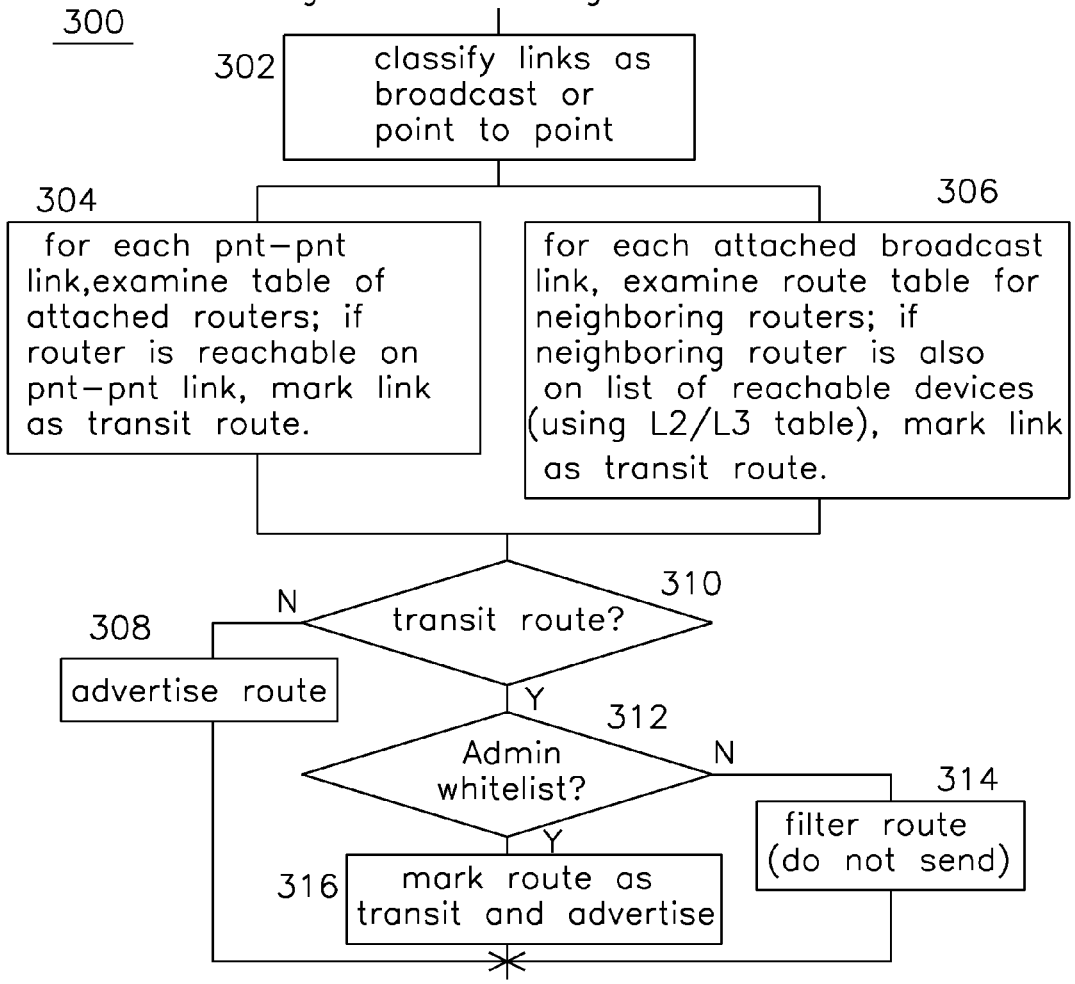

A route advertisement is transmitted to an interface of a router, the router having a route table, an address resolution table, and an attached router table, the route table having entries, each entry having at least a layer 3 address and an interface identifier, the address resolution table having entries with at least a layer 3 address and an associated layer 2 address, and the attached router table having addresses of neighboring routers, where the router examines the route table entries and identifies each entry as a point to point route or a broadcast route, thereafter for each said point to point route table entry where the route table address is not present in the attached router table, advertising the route table entry, and where the route table entry is a broadcast route with an address that is not present in the address resolution table, also advertising that route table entry.

In another embodiment of the invention, a route advertisement which includes an address and an associated transit link identifier is received on one or more interfaces of a router having a route table with entries having at least an address and an interface identifier, and if the transit link identifier associated with said received route advertisement is not marked as true, the received route information is added along with an interface identifier as an entry to the route table.

Description

A network interconnects a plurality of nodes such as computers or routers, which communicate with each other. A router is a device for routing packets to the devices on the network, where each device has a layer 3 (network) address and a layer 2 (MAC address), and each packet moving from one device to another across the network has a layer 3 source address and layer 3 destination addresses, and may additionally have a layer 2 source address and layer 2 destination address, as well. The router has one or more interfaces through which the packets are received and transmitted. In the Internet Protocol (IP), the layer 3 addresses are known as IP addresses, and for Ethernet packets, the layer 2 address is a media access controller (MAC) address.

Each router in a network may contain a plurality of internal tables used in the routing of packets from one interface to another. One such table is an "attached router table", which contains the addresses, such as layer 3 addresses, of the surrounding routers on a particular network. An attached router is a router that is reachable using a layer 2 address, and for the internet protocol (IP), is typically on the same layer 3 subnet. Another router table is the "address resolution table", which contains associations between layer 2 and layer 3 addresses, such that a packet may be formed from a layer 3 destination address which is resolved to a layer 2 address using the address resolution table. In IP, the layer 2 to layer 3 address resolution table is sometimes known as an "ARP table". Another table present in a router is the "route table", which contains entries, each entry having a layer 3 address and the interface identifier associated with that address.

Each router learns route table entries through route advertisements, whereby each router sends to its neighbors a list of network addresses reachable through that router. A router which receives a route advertisement on a particular interface is thereby able to determine which network addresses are reachable on that interface. Each router thereby independently forms a route table, such that each router receiving a packet destined for a given network address is able to determine which interface to transmit the packet. Route advertisements may be done incrementally, where only changes to the existing routes are advertised, or globally such that all route table entries are deleted and replaced by new routes contained in the route advertisement.

One type of network is known as a routed infrastructure, which comprises a plurality of networks, some of which networks are edge nodes, such as those used by end stations, and the remainder of which networks are internal networks used for moving packets from one edge node station to another. The internal networks that form the interconnection between edge nodes are known as transit links, since their purpose is the forwarding of packets from one edge node to another, and one particular characteristic of a transit link is that network traffic does not originate or terminate on a device on the transit link, but rather originates or terminates on a device on an edge network. An entry in a route table that enables traffic through a transit link is known as a transit route. The only time network traffic would terminate on a transit link is during administration, such as by telnet or ssh, where a user initiates a session that terminates to a router on a transit link.

FIG. 1 shows a network 100 which includes a routed infrastructure having internal networks B 112, C 116, D 120, E 124, G 134 as well as edge networks A1 104, A2 106, A3 108, F1 128, F2 130, F3 132, and H 136. Routers R1 10, R2 114, R3 118, R4 122, R5 126, and R6 138 may operate using an interior gateway routing protocol, whereby neighboring routers discover and share network routes. In one embodiment using the interior gateway routing protocols, each router advertises neighbor routes either incrementally or globally, and each router R1, R2, R3, R4, R5, and R6 maintains a route table, which contains a list of each known network and the interface associated with that network. The invention may be practiced where the route table for an interior gateway protocol may be generated using route advertisements provided by neighboring routers, such as IGRP (interior gateway routing protocol), EIGRP (Enhanced Interior Gateway Routing Protocol), OSPF (Open Shortest Path First), and RIP (Routing Information Protocol). RIP, IGRP, and EIGRP are examples of distance vector protocols and OSPF is a link-state protocol. The routers of the present invention may use these interior gateway protocols and advertise routes to neighboring routers either incrementally or globally, such that each router receives an advertised route from a neighbor and passes along route information on its transmitted advertised routes. Each router may thereby form and maintain a local route table which provides a mapping between network addresses and interfaces, such that each router does not contain a map of the network. The routers R1 through R6 of FIG. 1 provide network connectivity for edge networks A1, A2, A3, F1, F2, F3, and H. In one embodiment of the invention, route tables having a subset of the networks are maintained for each router, where the local router table entries comprise:

1) networks directly attached (neighboring) to the router;

2) edge networks outside of the routed infrastructure.

This rule set for building route tables has the effect of excluding transit links which are not directly attached (neighboring) to a particular router, thereby reducing the number of entries in the route table and improving network security by preventing traffic from routing to devices present on a network used as a transit link.

FIG. 2A shows the route table entries for the router R1 of FIG. 1. Directly attached networks A1, A2, A3, and B appear as entries accompanied by the interface through which traffic for that port should be directed, as do the edge networks F1, F2, F3, and H. In the preferred embodiment, entries for networks C, D, E, and G are not present, or alternatively may be present with the associated interface of "NULL" indicating that traffic to the NULL interface is not routed, as networks C, D, E, and G are transit links. FIG. 2B shows the route table for router R2, and includes the edge networks A1, A2, A3, F1, F2, F3, and H, and directly attached networks B, C, and G, each entry accompanied by the interface through which traffic for that port should be directed. Entries for transit networks D and E are not present in the table, or optionally may be present with the interface NULL as described for router R1. FIG. 2C, 2D, and 2E similarly contain entries to edge networks and attached networks according to the rule set described earlier.

The route tables for each router are propagated by advertised routes from adjacent routers. Using any of the interior gateway routing protocols previously described, each router forms a list of networks available to it and advertises them to its neighbors. For example, the entry for network F1 of FIG. 2A was advertised as attached to router R5 to router R4, which later passed it to router R3, which later passed it to R2, which subsequently passed it as an advertised route to R1, where it appears as an entry in the route table showing F1 is available through interface P4. Each router independently develops a route table, thereby forming a local route list which contains the addresses of the edge networks, as well as attached network information, and an address resolution table which performs layer 3 to layer 2 address resolution for packets directed to the attached router, as described earlier.

The route tables of the present invention thereby prevent traffic from routing to a network on a transit link more than one router hop away. For example, a packet entering any of the edge networks A1, A2, A3 and having any destination address for a device on network C, D, E, or G will not route to this destination as they are not present with a valid interface in the route table for router R1. Similarly, a packet entering edge network H and having a destination address for network B, C, D, or E will not route, as those network addresses are not present in attached router R6. In an alternative embodiment, the transit network entries may appear in supplementary route tables, or marked as transit links for administrative use only.

For administrative purposes, it may be necessary to temporarily or permanently add route information such that the networks which are absent from each router's route table may be used for router administration, such as to connect directly to a router using an encrypted internet protocol such as ssh (secure shell, for example by www.ssh.com) or an unencrypted internet protocol such as telnet, or any other protocol for router configuration or control. When such administration becomes necessary, an additional set of administrative routes may be enabled or added to the route table, as shown in supplemental white list of FIGS. 5A through 5E for routers R1 through R5, respectively. An administrative whitelist route entry is a route table entry added to the route table which is used exclusively for administrative purposes. These whitelist routes could be used in conjunction with a particular port number, source IP address, or other means to restrict the routes for only administrative use.

There are several mechanisms for transmitting and receiving route advertisements related to the route tables of the present invention. Additionally, link state protocols such as ISIS and OSPF utilize two circuit types known as broadcast and point-to-point, where broadcast circuits utilize a designated router for such broadcasts.

Point to Point and Broadcast Circuits

Point-to-point and broadcast are the two predominant circuit types used by link state routing protocols such as ISIS and OSPF. A point-to-point circuit provides connectivity from one station to another based on a final destination address. A broadcast circuit provides connectivity to all of the stations on a particular subnet using a particular route table entry. These two circuit types are treated differently by the interior gateway routing protocols (IGP) with respect to establishing neighbor adjacencies, flooding link-state information, representation of the topology, SPF calculation and protocol packets. The most important differences are that broadcast circuits utilize the concept of a designated router and are represented topologically as virtual nodes in the network topology graph. Compared with broadcast circuits, point-to-point circuits afford more straightforward interior gateway protocol operation. There is no designated router involved and there is no representation of the pseudo-node or network link state advertisement (LSA) in the link state database. For ISIS, there also is no periodic database synchronization. Conversely, if there are more than two routers on the local area network media, the traditional view of the broadcast circuit will reduce the routing information in the network.

When there are only two routers on the LAN, the connection between the two routers may be used as a point-to-point circuit. Conversely, even though a broadcast circuit is meant to handle more than two devices, there are cases where only two routers are connected over either the physical or logical LAN segment:

1. The media itself is being used for point-to-point operation between two routers, such as for long-haul operation.
2. There are only two routers on the physical LAN.
3. There are only two routers on a virtual LAN (vLAN).

In any of the above cases, the link state routing protocols will normally still treat the media as a broadcast circuit. Hence, they will have the overhead involved with protocol LAN operation without the benefits of reducing routing information and optimized flooding.

Being able to treat a LAN as a point-to-point circuit provides the benefit of reduction in the amount of information routing protocols must carry and manage. Designated Router (DR) or Designated Intermediate System (DIS) election can be omitted. Flooding can be done as in point to point links without the need of using "LSA reflection" by the DR in OSPF or periodic Complete Sequence Number PDU (CSNP) in ISIS. Also, if a broadcast segment wired as a point-to-point link can be treated as a point-to-point link, only the connection between the two routers would need to be advertised as a topological entity. Even when there are multiple routers on the LAN an ISP may want to sub-group the routers into multiple virtual LANs (vLANs) since this allows them to assign different costs to IGP neighbors. When there are only two routers in some of the vLANs, this LAN can be viewed by the IGP as a mesh of point-to-point connections.

In point-to-point connection over LAN media, it is desired to provide a configuration mechanism to inform the IGP that the circuit is type point-to-point irrespective of the physical media type. For the IGP, this implies that it will send protocol packets with the appropriate point-to-point information and expects to receive protocol packets as they would be received on a point-to-point circuit. Over LAN media, the MAC header must contain the correct multicast MAC address to be received by the other side of the connection. For vLAN environments, the MAC header must also contain the proper vLAN ID.

Route Advertisements

In one embodiment shown in the method of FIG. 3, each router examines each link to neighboring (attached) devices, and classifies the link as either point to point, or broadcast, as shown in step 302. For the point to point case 304, the network addresses of attached routers (neighboring routers) are classified as either transit routes or non-transit routes, and the non-transit routes are advertised 308, using any method known in the prior art for advertising routes to neighboring routers. Broadcast routes are similarly examined in step 306, and non-transit routes 310 are advertised 308 to neighboring routers. The determination of whether a particular neighborhood router is on a transit link may be performed by examining the layer 2 (L2 Media Access Controller address) layer 3 (L3 Internet Protocol address) address resolution table, which may optionally be implemented as a table for use by the Address Resolution Protocol (ARP), or it may be any table which provides bindings between L2 and L3 addresses. Any L3 entry in the address resolution table is present because of the presence of a device on the attached network, thereby indicating that the network is not transit. Transit routes are examined 312 to determine if an administrative whitelist is in use, and if they are present on an administrative whitelist as shown in FIGS. 5A through 5E, the route is marked as transit and advertised 316, such that a router receiving this route advertisement may mark this route exclusively for administrative use in its route table. If an administrative whitelist is not in use, the route is not advertised, and is filtered 314.

One issue which may arise related to the L2/L3 address resolution table is the "silent node trap", whereby a recently added neighboring router has not yet broadcast its presence to its neighbors, such as by a "hello" packet or by an L2 ARP broadcast. In such a situation, the silent router will not be found in either the attached router table or address resolution table, resulting in an incorrect result. In one embodiment of the invention, a router which incorporates the protocol described herein may avoid the silent node trap by issuing a grat ARP (gratuitous Address Resolution Protocol packet) on each interface periodically to ensure that the address resolution protocol table contains entries for all of the attached routers.

Figures 4, 5A, 5B:
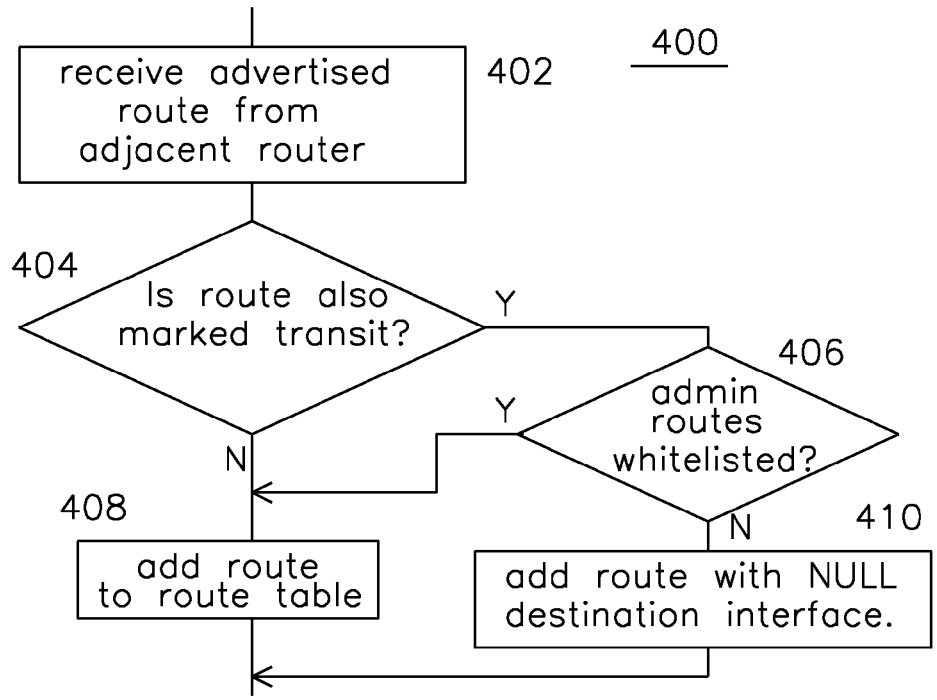

FIG. 4 shows a method 400 for adding received advertised routes to a route table. An advertised route is received 402 on an interface from a neighboring router. If the advertised route is marked transit 404, and an administrative whitelist is enabled which includes this route, the route is added 408. The route is also added if the advertised route is not marked transit in step 404. If the advertised route is marked as transit and administrative whitelists are not enabled in step 406, the advertised route may either be dropped and thereby not entered in the route table in step 410, or it may be added with a destination interface of NULL, explicitly indicating that packets to this interface are to be dropped.

Figure 6:
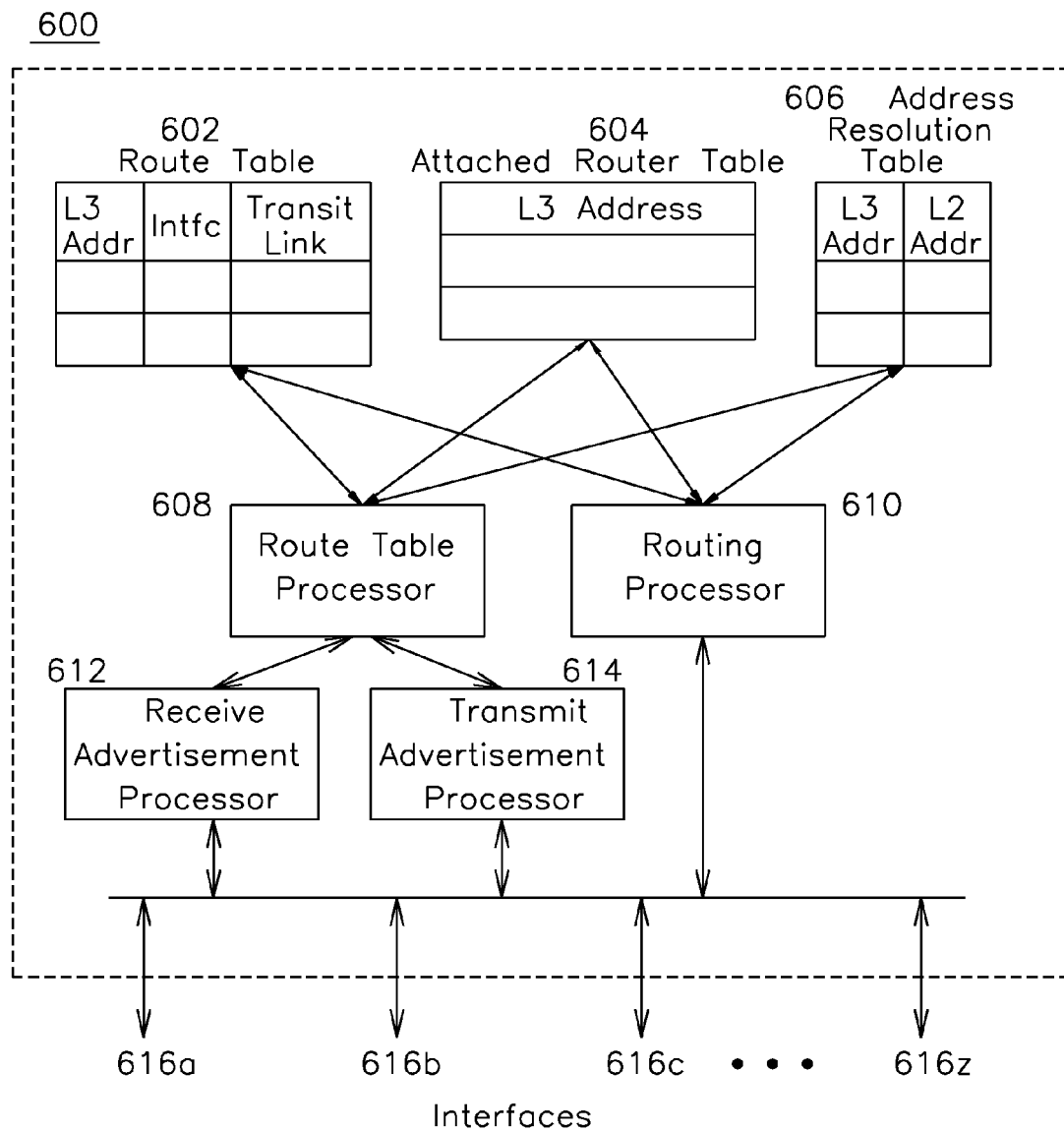
FIG. 6 illustrates a block diagram for a router with transit link protection.

FIG. 6 shows a router 600 of the present invention with interfaces 616a through 616z, where the router includes a route table 602 such as was described for the route tables of FIGS. 2A through 2E. Neighbor table 604 contains the addresses of directly attached routers which are on interfaces 616a through 616a of the present router 600, and address resolution table 606 contains the bindings of L2 to L3 addresses. Route table processor 608 may handle the management of tables 602, 604, and 606, while the routing processor 610 performs the actual routing functions known in the art of routers. Receive advertisement processor 612 may perform the functions described for FIG. 4, and transmit advertisement processor 614 may perform the functions described for FIG. 3. An administrative whitelist enable may be maintained in router 600 to determine when the administrative whitelist functions such as step 406 of FIG. 4 or step 312 of FIG. 3 are to be performed.

The present invention is not limited to the embodiments shown for example in the present disclosure. For example, the route tables of FIG. 2A through 2E show entries which do not contain transit links as identified for each figure. It is also possible to practice the invention with the transit links shown in the route table having the interface identifier of NULL, such that a packet for that network address is dropped. There are similarly many different ways of enabling routing of administrative packets. FIGS. 5A through 5E show the administrative routes in supplementary tables, although it is also possible for the administrative whitelist routes to be combined with the corresponding existing route tables 2A through 2E.

What is claimed is:

1. A method comprising:
   for each route table entry in a route table, each said route table entry having at least a layer 3 address and an interface identifier, identifying said route table entry as a point to point route or a broadcast route;
   advertising each said point to point route table entry if said route table address is not present in an attached router table, said attached router table having a list of attached routers for each interface;
   advertising each said broadcast route table entry if said route table address is not present in an address resolution table, said address resolution table providing an association between a layer 2 address and a layer 3 address, advertising said route table entry;
   where said advertising said route table entry results in the transmission of at least said associated layer 3 address on at least one router interface.

2. The method of claim 1 where a route is also advertised as a transit route if an administrative whitelist is enabled and said route table entry is a point to point entry and said layer 3 route table address is in said attached router table list.

3. The method of claim 1 where a route is also advertised as a transit route if an administrative whitelist is enabled and said route table entry is a broadcast entry and said broadcast route address is present in said address resolution table.

4. The method of claim 1 where said attached router table is also said address resolution table.

5. The method of claim 1 where said layer 3 address is either an IP address or a range of IP addresses.

6. The method of claim 1 where said address resolution table layer 2 address is a MAC address and said address resolution table layer 3 address is an IP address.

7. The method of claim 1 where said identifying said route table entry as point to point route or broadcast route is a field in said route table entry.

8. The method of claim 1 where said administrative whitelist is a list of layer 3 addresses accompanied by an associated interface identifier.

9. The method of claim 1 where said administrative whitelist is associated with each said route table entry.

10. The method of claim 1 where at least one said interface is an Ethernet interface.

11. A method to be implemented in an electronic environment in which a processor is involved in routing packets in a network, the method comprising:
    receiving route information comprising at least an address, an associated interface, and an associated transit link identifier that is either true or false;
    examining said route information address in a route table having one or more entries, each said route table entry having at least an address, an interface, and optionally a transit link identifier,
    if the transit link identifier associated with said received route information address is not marked as true, adding said received route information as an entry to said route table.

12. The method of claim 11 where:
    if the transit link identifier associated with said received route information is marked as true and an administrative whitelist is enabled, the associated said route information including said transit link identifier is added as an entry to said route table;
    if the transit link identifier associated with said received route information is marked as true and an administrative whitelist is not enabled, the associated said route information is either not added to said route table, or is added with a NULL destination address.

13. The method of claim 11 where said route table entry address is an IP address.

14. The method of claim 11 where a packet is received on at least one said interface which is an Ethernet interface.

15. The method of claim 11 where said received route information is associated with a route advertisement from an attached router.

16. An apparatus comprising:
    at least one interface for advertising routes;
    a route table containing at least one entry, each entry having an address, an interface and optionally a transit link indicator, each said entry being either a point to point entry or a broadcast entry;
    an attached router table containing addresses;
    an address resolution table having at least one entry, each entry having a layer 2 address and an associated layer 3 address;
    said apparatus only advertising routes from said route table which are either:
    said point to point entries with said route table address having no matching address entry in said attached router table;
    said broadcast entries with said route table address having no matching address entry in said address resolution table.

17. The apparatus of claim 16 where said apparatus also advertises routes which are marked as said transit links which are:
    point to point entries with said route table address having a matching address entry in said attached router table;
    broadcast entries with said route table address having a matching address entry in said address resolution table.

18. The apparatus of claim 16 where said route table indicates said broadcast entries and said point to point entries.

19. An apparatus comprising:
    a route table for storing route table entries, each said route table entry having at least a layer 3 address and an interface identifier and an identifier that the entry is either point to point or broadcast;
    an address resolution table for storing one or more entries, each said address resolution table entry having at least a layer 2 address and an associated layer 3 address;
    an attached router table for storing a list of addresses;
    at least one interface for receiving said advertised routes, said advertised routes having an address, an interface identifier, and a transit link identifier that is either true or false;
    where a received advertised route is added as an entry to said route table if said transit link identifier is false.

20. The apparatus of claim 19 where said received advertised route is also added as an entry to said route table if said transit link identifier is true and an administrative whitelist is enabled.

* * * * *